(12) United States Patent
Lin et al.

(10) Patent No.: US 8,936,304 B2
(45) Date of Patent: Jan. 20, 2015

(54) PULL BAR AND A SUNSHADE DEVICE INCLUDING THE SAME

(71) Applicant: Macauto Industrial Co., Ltd., Tainan (TW)

(72) Inventors: Paul Lin, Tainan (TW); Huang-Jen Wang, Pingtung (TW)

(73) Assignee: Macauto Industrial Co., Ltd., Tainan (TW)

( * ) Notice: Subject to any disclaimer, the term of this patent is extended or adjusted under 35 U.S.C. 154(b) by 0 days.

(21) Appl. No.: 14/100,244

(22) Filed: Dec. 9, 2013

(65) Prior Publication Data
US 2014/0183908 A1     Jul. 3, 2014

(30) Foreign Application Priority Data

Dec. 28, 2012   (TW) .............................. 101225566 A

(51) Int. Cl.
| | | |
|---|---|---|
| *B60J 3/00* | (2006.01) | |
| *B60J 7/043* | (2006.01) | |
| *B60J 7/00* | (2006.01) | |
| *B60J 1/20* | (2006.01) | |

(52) U.S. Cl.
CPC .............. *B60J 7/0015* (2013.01); *B60J 1/2044* (2013.01)

USPC ........... 296/214; 296/219; 296/208; 454/129; 160/265; 160/370.21

(58) Field of Classification Search
CPC ....................................... B60J 7/0015
USPC ........ 296/214, 219, 208; 160/370.21–370.23, 160/265; 454/129, 135, 136, 137
See application file for complete search history.

(56) References Cited

U.S. PATENT DOCUMENTS 4,717,200 A * 1/1988 Kruger ......................... 296/214

FOREIGN PATENT DOCUMENTS

JP         2006-264354        * 10/2006

* cited by examiner

*Primary Examiner* — Dennis H Pedder
(74) *Attorney, Agent, or Firm* — Squire Patton Boggs (US) LLP

(57) ABSTRACT

A pull bar is adapted for attachment to one end of a screen of a sunshade device beneath a sunroof of a vehicle. The pull bar includes an upper strip body and a lower strip body. The upper strip body is adapted to abut against an upper surface of the screen. The lower strip body is adapted to abut against a lower surface of the screen. The upper and lower strip bodies cooperatively define at least one air flow passage that extends through the upper and lower strip bodies to permit air to flow into or out of the vehicle.

7 Claims, 6 Drawing Sheets

PULL BAR AND A SUNSHADE DEVICE INCLUDING THE SAME

CROSS-REFERENCE TO RELATED APPLICATION

This application claims priority of Taiwanese Application No. 101225566, filed on Dec. 28, 2012.

BACKGROUND OF THE INVENTION

1. Field of the Invention

The invention relates to a pull bar of a sunshade device, more particularly to a pull bar for attachment to one end of a screen of a sunshade device beneath a sunroof of a vehicle.

2. Description of the Related Art

For a vehicle provided with a sunroof, a sunshade device is generally mounted beneath the sunroof for blocking sunlight from entering the vehicle when the sunroof is open. A conventional sunshade device generally includes a winding mechanism, two guide rails that are adapted to be respectively mounted on two opposite sides of the sunroof, a screen that is retractably connected to the winding mechanism and that has two lateral sides movably and respectively disposed in the guide rails, and a pull bar that is mounted on a free end of the screen. After the screen is extended away from the winding mechanism, the screen can completely cover an opening of the sunroof.

However, the conventional sunshade device has some shortcomings when in use. In an open state of the sunroof, an interior of the vehicle is an incompletely enclosed space. At the moment of closing a vehicular door, air inside the interior of the vehicle is propelled to flow outwardly through the sunroof. At the moment of opening a vehicular door, air outside the vehicle is drawn to flow into the interior of the vehicle through the sunroof.

Since the screen has an air permeability that is smaller than that of the opening of the sunroof, noise is generated when the screen taps the sunroof as air flows into or out of the vehicle through the sunroof. In addition, during movement of the vehicle, noise is also caused by the screen tapping the sunroof when air flows into the vehicle through an open vehicular window and expels outside from the sunroof.

SUMMARY OF THE INVENTION

Therefore, an object of the present invention is to provide a pull bar and a sunshade device including the same that can alleviate the aforesaid drawbacks of the prior art.

According to one aspect of this invention, a pull bar is adapted for attachment to one end of a screen of a sunshade device and includes an upper strip body and a lower strip body.

The upper strip body is adapted to abut against an upper surface of the screen. The lower strip body is adapted to abut against a lower surface of the screen.

The upper and lower strip bodies cooperatively define at least one air flow passage that extends through the upper and lower strip bodies to permit air to flow into or out of the vehicle.

According to another aspect of this invention, a sunshade device is adapted to be mounted beneath a sunroof of a vehicle and includes a screen and the abovementioned pull bar. The screen is adapted to be mounted beneath the sunroof.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
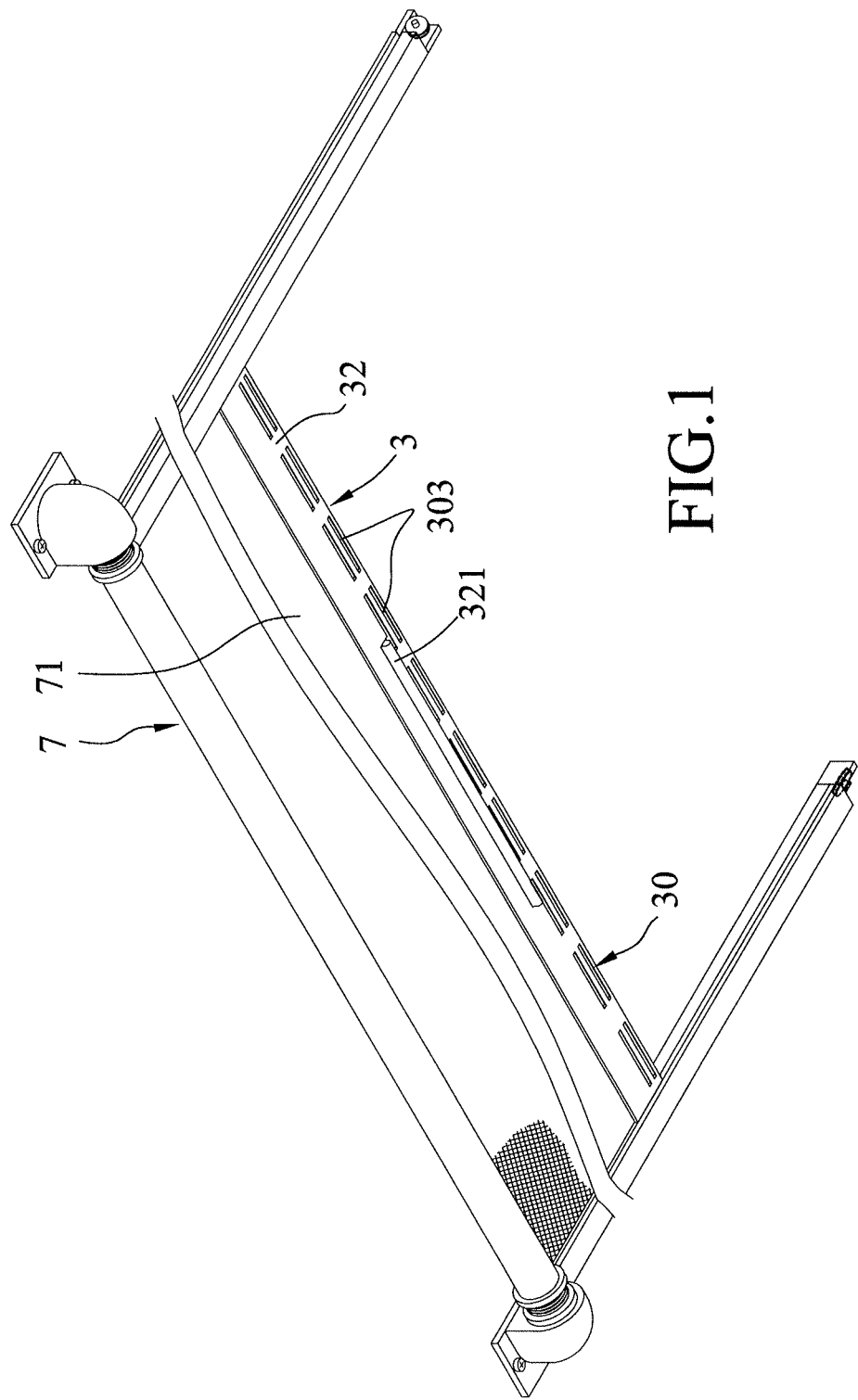
FIG. 1 is a perspective view illustrating the preferred embodiment of a sunshade device including a pull bar according to the present invention.
Figure 2:
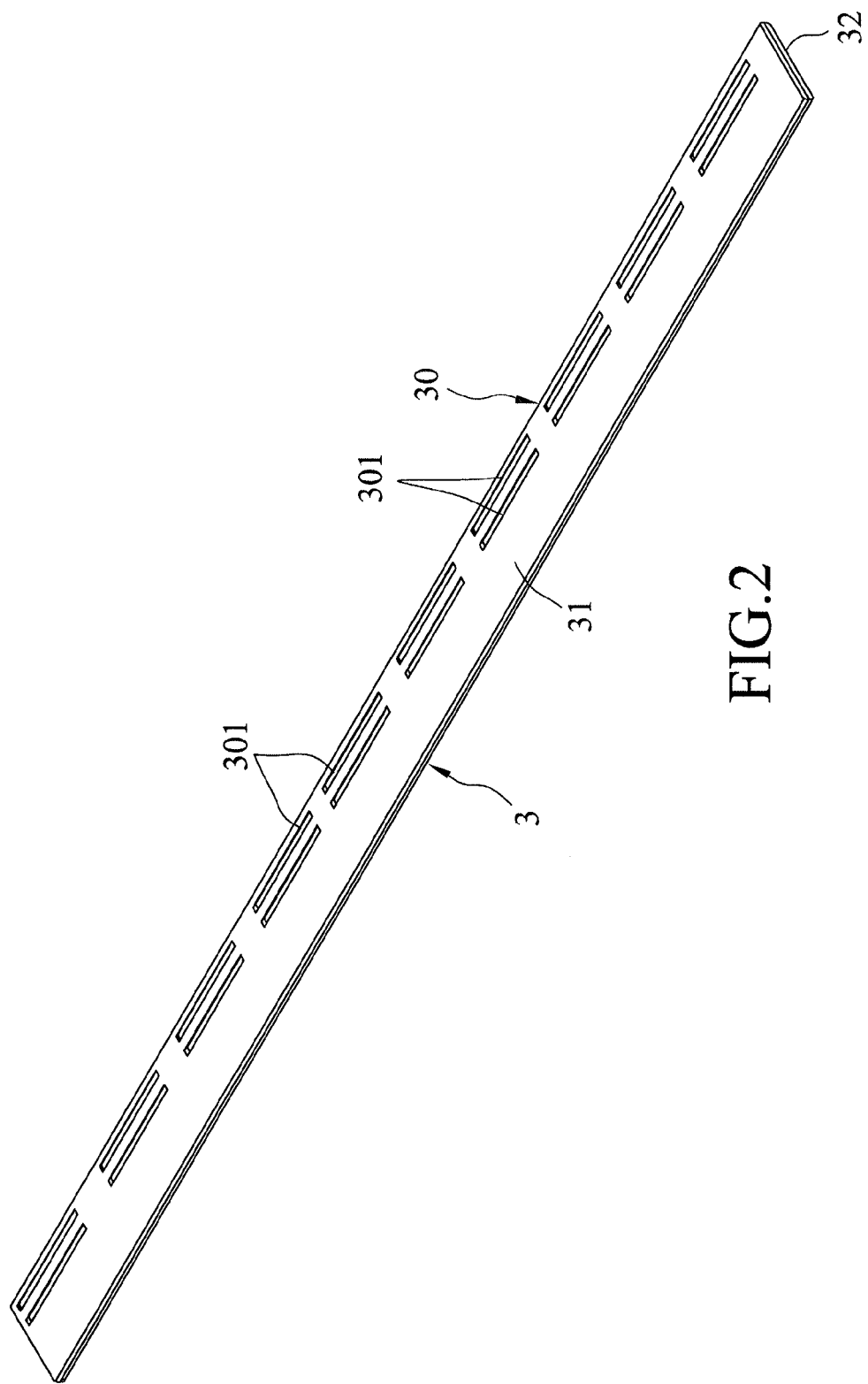
FIG. 2 is a top perspective view illustrating the pull bar of the preferred embodiment.

Referring to FIGS. 1 and 2, the preferred embodiment of a sunshade device 7 according to the present invention is adapted to be mounted beneath a sunroof (not shown) of a vehicle (not shown). The sunshade device 7 includes a screen 71 that is adapted to be mounted beneath the sunroof, and a pull bar 3 that is attached to one end of the screen 71. The pull bar 3 is operable to pull the screen 71 for covering an opening (not shown) of the sunroof.

Figure 3:
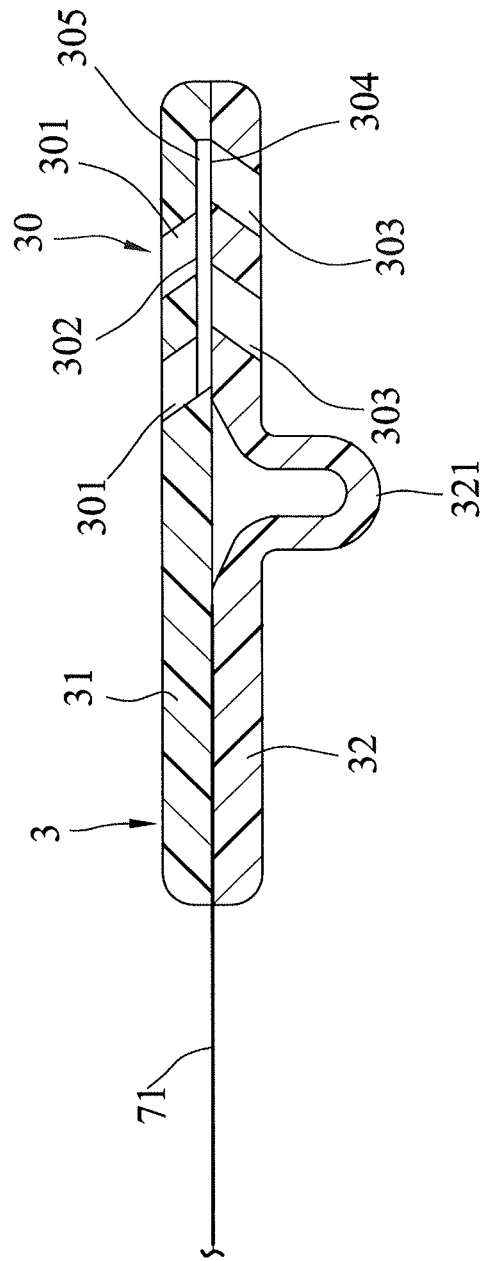
FIG. 3 is a side sectional view illustrating one structure of an air flow passage of the preferred embodiment.
Figure 4:
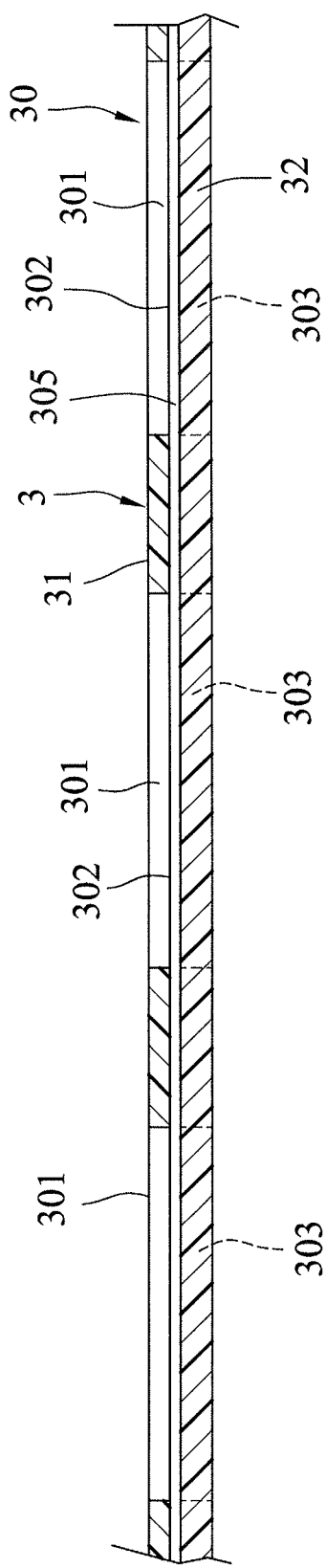
FIG. 4 is a fragmentary rear sectional view of the preferred embodiment.

With reference to FIGS. 2 to 4, the pull bar 3 includes an upper strip body 31 that abuts against an upper surface of the screen 71, and a lower strip body 32 that abuts against a lower surface of the screen 71. The upper and lower strip bodies 31, 32 cooperatively define at least one air flow passage 30 that extends through the upper and lower strip bodies 31, 32 to permit air to flow into or out of the vehicle. Preferably, the lower strip body 32 is provided with a gripping protrusion 321 that extends in a lengthwise direction of the pull bar 3 and that protrudes outwardly from the lower strip body 32.

The air flow passage 30 includes at least one upper hole 301 that extends through the upper strip body 31, and at least one lower hole 303 that extends through the lower strip body 32. Preferably, the air flow passage 30 further includes a communication space 305 between opposite adjacent surfaces of the upper and lower strip bodies 31, 32. The communication space 305 intercommunicates with the upper and lower holes 301, 303. In this preferred embodiment, the air flow passage 30 includes a plurality of upper holes 301 that extend through the upper strip body 31, a plurality of lower holes 303 that extend through the lower strip body 32, and a communication space 305 that is formed between opposite adjacent surfaces of the upper and lower strip bodies 31, 32. The communication space 305 intercommunicates with the upper and lower holes 301, 303.

In this preferred embodiment, the upper holes 301 are staggered with respect to the lower holes 303. In other words, the upper holes 301 indirectly communicate the lower holes 303 in a top-bottom direction of the pull bar 3. Preferably, there are two spaced-apart upper rows of the upper holes 301 extending in a lengthwise direction of the upper strip body 31, and each of the upper holes 301 of one of the upper rows is aligned with a corresponding one of the upper holes 301 of the other of the upper rows. For each of the upper rows, the upper holes 301 are spaced apart from each other in the lengthwise direction of the upper strip body 31. Each of the upper holes 301 extends in a direction that is inclined with a line perpendicular to the upper strip body 31. More preferably, there are two spaced-apart lower rows of the lower holes 303 extending in a lengthwise direction of the lower strip body 32, and each of the lower holes 303 of one of the lower rows is aligned with a corresponding one of the lower holes 303 of the other of the lower rows. For each of the lower rows, the lower holes 303 are spaced apart from each other in the lengthwise direction of the lower strip body 32. Each of the lower holes 303 extends in a direction that is inclined with a line perpendicular to the lower strip body 32. In this preferred embodiment, each of the upper holes 301 has a bottom open end 302 that faces downwardly and communicates the communication space 305. Each of the lower holes 303 has an upper open end 304 that faces upwardly and communicates the communication space 305. The bottom open ends 302 of the upper holes 301 are staggered with respect to the upper open ends 304 of the lower holes 303.

In this preferred embodiment, the communication space 305 is indented from a bottom surface of the upper strip body 31. In actual implementation, the communication space 305 can also be indented from an upper surface of the lower strip body 32. Alternatively, the bottom surface of the upper strip body 31 and the upper surface of the lower strip body 32 can have corresponding indented portions for cooperatively forming the communication space 305.

With reference back to FIGS. 1, 3 and 4, by virtue of the structural design of the pull bar 3, when the sunroof is in the open state and the screen 71 of the sunshade device 7 is extended, the air flow passage 30 permits air to flow into and out of the vehicle through the sunroof. At the moment of opening/closing a vehicular door (not shown), air is directed to flow through the air flow passage 30 of the pull bar 3 so as to effectively reduce and prevent the screen 71 from wiggling and tapping the sunroof. In addition, during movement of the vehicle, the air flow passage 30 can also direct air flowing into the vehicle from an open vehicular window to be expelled outside of the vehicle, such that wiggling and tapering of the screen 71 on the sunroof caused by the flowing air can be prevented.

Figure 5:
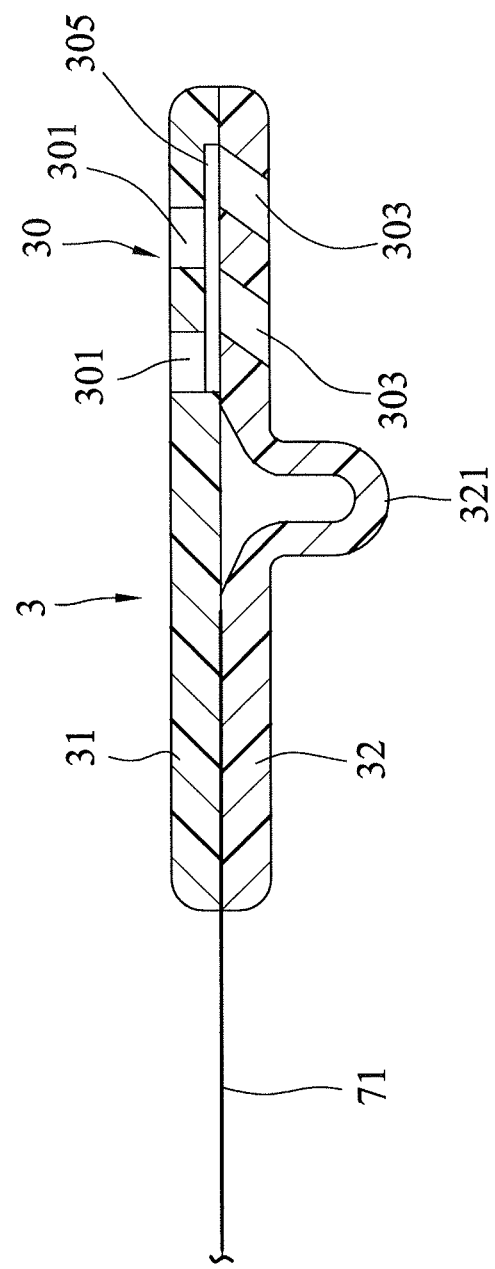
FIG. 5 is a side sectional view illustrating another structure of the air flow passage of the preferred embodiment.
Figure 6:
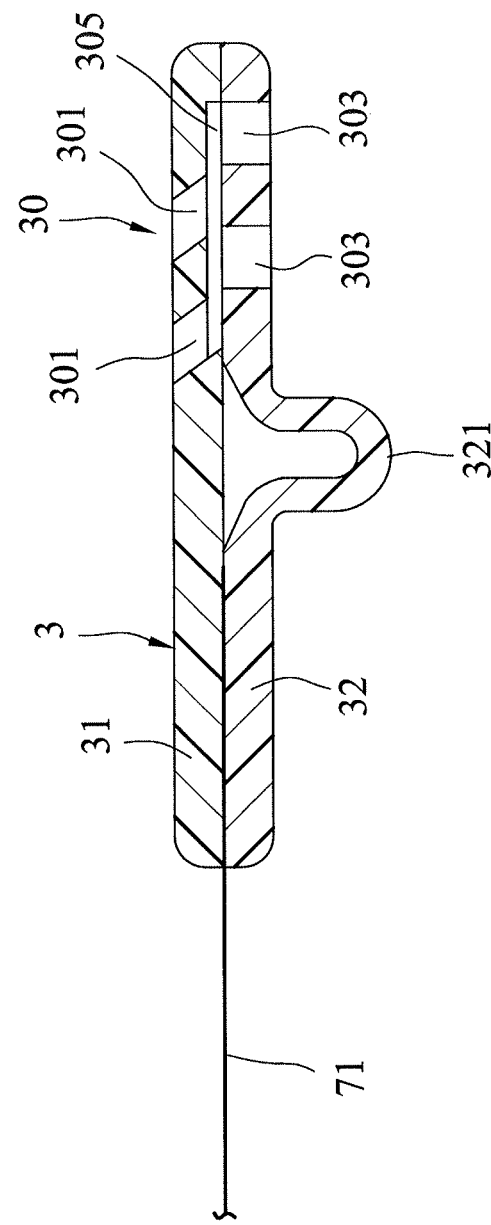
FIG. 6 is a side sectional view illustrating still another structure of the air flow passage of the preferred embodiment.

In this preferred embodiment, the upper and lower holes 301, 303 are respectively inclined and are staggered with each other for blocking sunlight through the air flow passage 30. However, the present invention is not limited in this respect. As shown in FIGS. 5 and 6, it is acceptable when only either the upper holes 301 are inclined relative to the upper strip bodies 31 or only the lower holes 303 are inclined relative to the lower strip bodies 32, as long as the bottom open ends 302 of the upper holes 301 are staggered with respect to the upper open ends 304 of the lower holes 303 for the purpose of blocking the sunlight to be achieved.

In addition, the communication space 305 is primary for intercommunication with the upper and lower holes 301, 303, thereby increasing an air flow rate between the upper and lower holes 301, 303. However, in actual implementation, the communication space 305 is not essential. The upper and lower holes 301, 303 may directly communicate each other, such that air can be directed to flow into or outside of the vehicle to prevent the screen 71 from wiggling and tapping on the sunroof by reducing the influence of air flow on the screen 71.

To sum up, by virtue of the structural design of the pull bar 3, the air flow passage 30 effectively permits air to flow into and out of the vehicle at the moment of opening/closing the vehicular door or during movement of the vehicle with an open window. Therefore, the screen 71 is less influenced by the air flow, and the wiggling of the screen 71 is reduced.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A pull bar adapted for attachment to one end of a screen of a sunshade device beneath a sunroof of a vehicle, comprising:
    an upper strip body adapted to abut against an upper surface of the screen; and
    a lower strip body adapted to abut against a lower surface of the screen;
    wherein said upper and lower strip bodies cooperatively define at least one air flow passage that extends through said upper and lower strip bodies to permit air to flow into or out of the vehicle;
    wherein said air flow passage includes at least one upper hole extending through said upper strip body, and at least one lower hole extending through said lower strip body; and
    wherein said air flow passage further includes a communication space between opposite adjacent surfaces of said upper and lower strip bodies, said communication space intercommunicating with said upper and lower holes.

2. The pull bar as claimed in claim 1, wherein said air flow passage includes a plurality of said upper holes that extend through said upper strip body, a plurality of said lower holes that extend through said lower strip body, said communication space intercommunicating with said upper and lower holes.

3. The pull bar as claimed in claim 2, wherein said upper holes are staggered with respect to said lower holes.

4. The pull bar as claimed in claim 3 wherein each of said upper holes has a bottom open end that faces downwardly and communicates said communication space, each of said lower holes having an upper open end that faces upwardly and communicates said communication space, said bottom open ends of said upper holes being staggered with respect to said upper open ends of said lower holes.

5. The pull bar as claimed in claim 1, wherein said upper hole extends in a direction that is inclined with a line perpendicular to said upper strip body.

6. The pull bar as claimed in claim 1, wherein said lower hole extends in a direction that is inclined with a line perpendicular to said lower strip body.

7. A sunshade device adapted to be mounted beneath a sunroof of a vehicle, comprising:
    a screen adapted to be situated beneath the sunroof; and
    a pull bar attached to one end of said screen, said pull bar including
        an upper strip body abutting against an upper surface of said screen, and
        a lower strip body abutting against a lower surface of said screen, said upper and lower strip bodies cooperatively defining at least one air flow passage that extends through said upper and lower strip bodies to permit air to flow into or out of the vehicle;
    wherein said air flow passage includes at least one upper hole extending through said upper strip body, and at least one lower hole extending through said lower strip body; and wherein said air flow passage further includes a communication space between opposite adjacent surfaces of said upper and lower strip bodies, said communication space intercommunicating with said upper and lower holes.

\* \* \* \* \*